Nov. 17, 1964 L. C. MOORE ETAL 3,157,859

ELECTRONIC ANALOG STORAGE DEVICE

Filed Aug. 19, 1963 2 Sheets-Sheet 1

LOYD C. MOORE
KLAUS J. HECKER
INVENTORS

BY J. M. St. Amand
ATTORNEY

ELECTRONIC ANALOG STORAGE DEVICE

Filed Aug. 19, 1963 2 Sheets-Sheet 2

LOYD C. MOORE
KLAUS J. HECKER
*INVENTORS*

BY J. M. St. Amand
ATTORNEY 3,157,859
ELECTRONIC ANALOG STORAGE DEVICE

Loyd C. Moore, Arlington, and Klaus J. Hecker, Riverside, Calif., assignors to the United States of America as represented by the Secretary of the Navy
Filed Aug. 19, 1963, Ser. No. 303,190
8 Claims. (Cl. 340—173)
(Granted under Title 35, U.S. Code (1952), sec. 266)

The invention herein described may be manufactured and used by or for the Government of the United States of America for governmental purposes without the payment of any royalties thereon or therefor.

The present invention relates to electronic circuits and more particularly to a circuit which permits storage of an analog level for a relatively long period of time. The basic circuit used in the present invention is the well known boxcar circuit. The boxcar circuit uses a capacitor for storing the analog input. In order for the boxcar output to be truly representative of the input sample, the boxcar storage capacitor must be discharged before each new sample is accepted. A gating circuit in the input then samples the analog voltage and dumps a charge corresponding to this level into the storage capacitor. The size of the capacitor and the charging path determines the time required for charging the capacitor. After the charge is stored on the capacitor any resistance which may be parallel to the capacitor will cause it to start discharging. Consequently, the charging time and useful storage time are relative to each other and is in the order of magnitude of $10^5$. Because of this relationship, it is not possible to charge a capacitor in a very short period of time and keep the charge for a long period of time. The invention disclosure herein described permits an increase of this ratio by a considerable factor. Also, the output of a conventional boxcar changes its output level considerably during discharge whereas the presently described invention provides a stepped output directly from one level to the next in conjunction with the sampled input.

It is an object of the invention to provide a new analog storage device.

Another object of the invention is to provide an electronic circuit which permits storage of an analog level for a relatively long period of time.

Other objects and many of the attendant advantages of this invention will become readily appreciated as the same becomes better understood by reference to the following detailed description when considered in connection with the accompanying drawings wherein.

Figure 1:
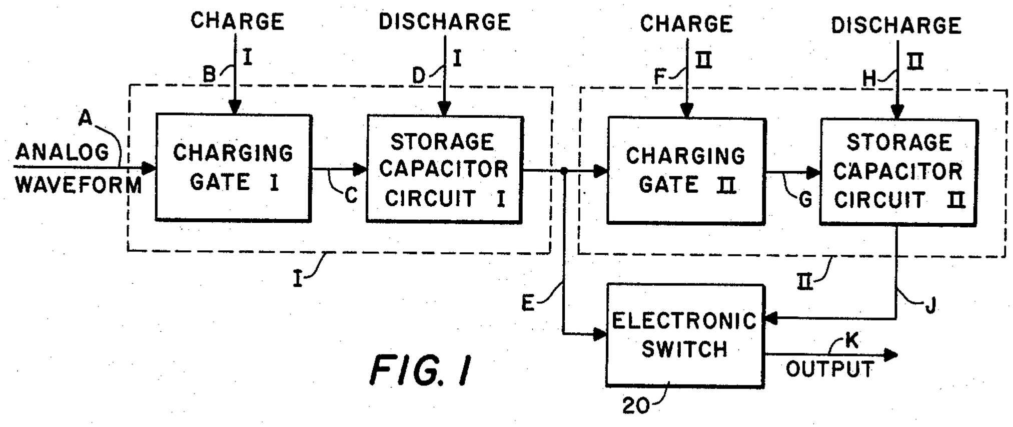
FIG. 1 is a block circuit diagram of a preferred embodiment of the invention.
Figure 2:
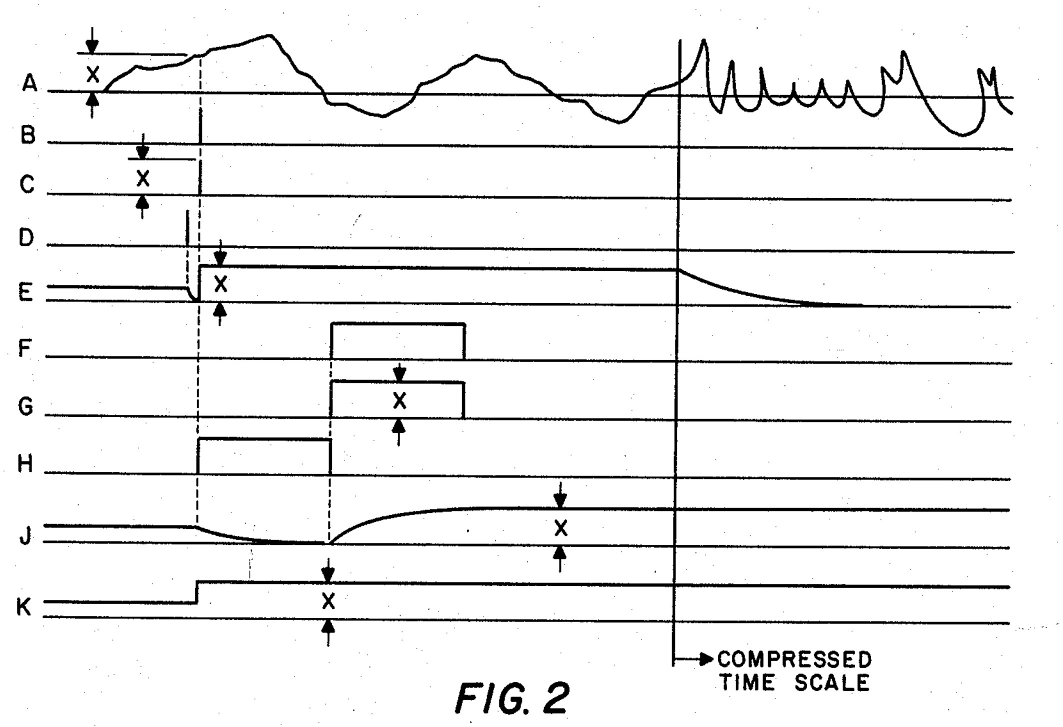
FIG. 2 shows the waveforms at different points (A through K) in the circuit of FIG. 1.

As shown in FIG. 1, the circuit consists of two boxcar circuits (I and II) in series each boxcar circuit consisting of a charging gate and storage capacitor circuit. Well known charging circuits that can be used may be found in Cruft, Electronics Circuits and Tubes, McGraw-Hill, 1947, page 837; R. W. Landee, Electronic Designers Handbook, McGraw-Hill, 1956, pages 12–18; Millman, Pulse and Digital Circuits, McGraw-Hill, 1956, page 436. The waveforms at different points (A through K) in the circuitry of FIG. 1 are shown in FIG. 2. If the analog waveform A at point $t_0$ is the desired level to be sampled and stored, a discharge pulse just prior to $t_0$ is required. Discharge pulse D is used to discharge storage capacitor circuit I at the time shown at waveform D. Due to the short time constant of storage capacitor circuit I it may be charged and discharged rapidly, but because of this short time constant it cannot retain its charge for any length of time. At time $t_0$ the pulse of waveform B opens charging gate I and a pulse, the level of the input waveform, appears at C. This pulse charges storage capacitor circuit I to the same level as seen in waveform E. The discharge of storage capacitor circuit II is started at $t_0$ by the waveform shown at H. Due to the long time constant of this storage capacitor a longer time for the discharge is required. After storage capacitor circuit II has been discharged a charging pulse F opens charging gate II and allows the level X, shown at G, on storage capacitor circuit I to be transferred to storage capacitor circuit II. The output of storage capacitor circuit II is shown in waveform J. The electronic switch 20 is set to the output of storage capacitor circuit I from $t_0$ to the time where storage capacitor circuit II is completely charged and then is switched to the output of storage capacitor circuit II. Consequently, the output waveform K will assume the level X at time $t_0$ and will display this level until storage capacitor circuit II begins to decay or until a new level is stored in storage capacitor circuit I and electronic switch 20 is switched to its output. The described circuit will permit, for example, the sampling of an analog waveform in $\frac{1}{10}$ of a microsecond and to store this level for several minutes.

Figure 3:
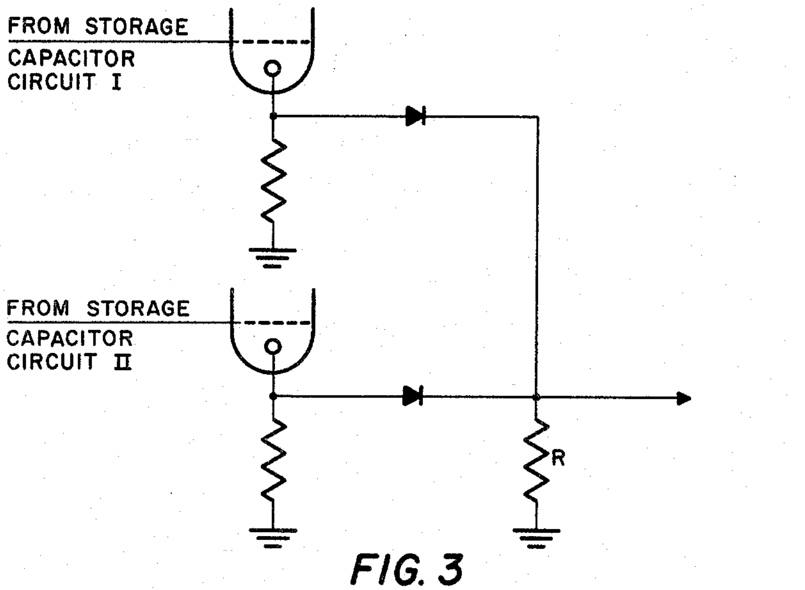
FIG. 3 is a circuit diagram of a maximum level detector which may be used in place of the electronic switch used in the circuit of FIG. 1.

As another embodiment to the system described above, the electronic switch 20 may be replaced by the maximum level detector as shown in FIGURE 3. The outputs from the two storage capacitor circuits I and II are fed through cathode followers to obtain low impedance. The output of each cathode follower is fed through a diode to a common resistor R. The voltage of the output resistor R will then assume the value of the larger of the two input voltages. During the period storage capacitor circuit I is being discharged the output level will be held constant by storage capacitor circuit II. In the event, the new level that is sampled and stored in storage capacitor circuit I is less than the previous level, as soon as storage capacitor circuit II discharges below the new level the output waveform K then assumes the new level. This assures a constant output varying only by the difference between levels of consecutive samples, assuming the samples are taken within the time constant of storage capacitor circuit II. The advantage of the maximum level detector (FIG. 3) as compared to the electronic switch 20 is basically a simplification of the circuit since no switch pulses for electronic switch 20 are required.

Figure 4:
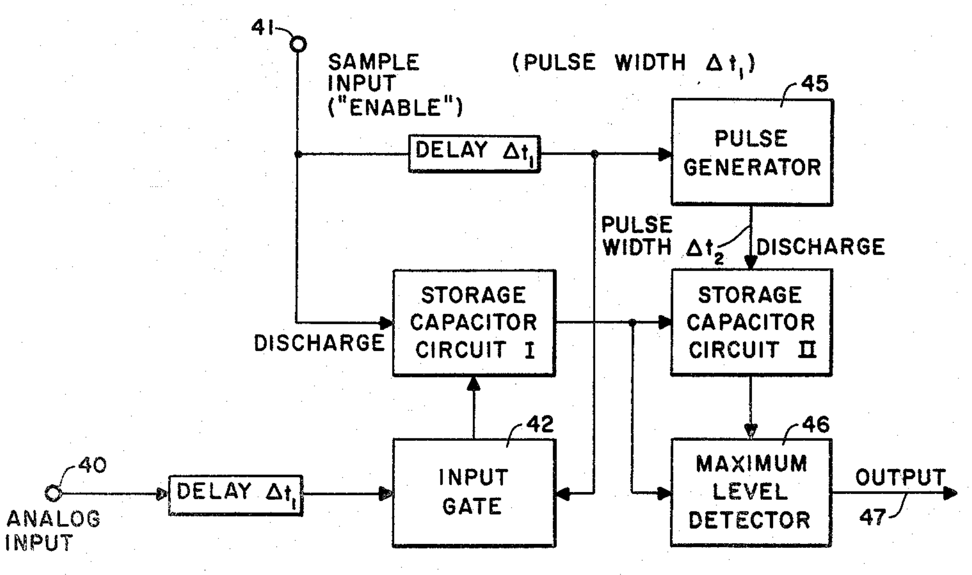
FIG. 4 is a block diagram of another embodiment of the invention.

As a further embodiment, the circuit can be modified by replacing charging gate II by a common cathode follower. If storage capacitor circuit II is discharged, it will always charge to the level at point E, as long as this level is larger than the charge in storage capacitor circuit II. Consequently, as soon as storage capacitor circuit II is discharged it will immediately charge up to the level that is stored in storage capacitor circuit I. As the level in storage capacitor circuit I drops due to its shorter time constant, storage capacitor circuit II will be prevented from discharging by use of a diode as in conventional boxcar circuitry and consequently will keep the output at the original level for a much longer period of time. One possible form this circuit may take is shown in FIG. 4. An analog voltage is fed to the analog input 40. At the time the analog voltage is to be sampled and stored, an "enable" pulse of pulse width $\Delta t_1$ is fed to the sample input 41. This pulse discharges storage capacitor circuit I. After a short delay equal to the pulse width $\Delta t_1$, the input gate 42 is opened. In order to sample the analog voltage which was at input terminal 40 at the time the sample pulse was present the analog signal is also delayed by a time interval $\Delta t_1$. This causes the sample pulse and the desired analog level to appear at input gate 42 at the same time. Depending on the waveform of the analog input and the accuracy required, the delay in the analog input may not be required. The delayed pulse from sample input 41 triggers pulse generator 45, providing a pulse of width $\Delta t_2$. This pulse discharges storage capacitor circuit II. After discharge, storage capacitor circuit II charges up to the level that is stored in storage capacitor circuit I. The maximum level detector 46 detects the higher level of the two storage capacitor circuits I and II and feeds this to the output.

Obviously many modifications and variations of the present invention are possible in the light of the above teachings. It is therefore to be understood that within the scope of the appended claims the invention may be practiced otherwise than as specifically described.

What is claimed is:

1. An electronic analog storage device comprising:
(*a*) first and second boxcar circuits connected in series,
(*b*) each said boxcar circuit including a gate means and a storage means,
(*c*) the storage means of said first boxcar circuit having a short time constant which allows rapid charging and rapid discharging thereof, the storage means of said second boxcar circuit having a long time constant and requiring a longer time for charging and discharging thereof,
(*d*) pulse means for initiating the discharging of the storage means of said first boxcar circuit,
(*e*) pulse means for opening the gate means of said first boxcar circuit and allowing a pulse to charge the storage means thereof,
(*f*) pulse means for initiating the discharging of the storage means of said second boxcar circuit,
(*g*) pulse means for opening the gate means of said second boxcar circuit after the storage means of said second boxcar circuit is discharged allowing the charge on the storage means of said first boxcar circuit to be transferred to the storage means of said second boxcar circuit,
(*h*) means, connected to the output of the storage means of both said first and said second boxcar circuits, whose output level will indicate the value of the larger of the outputs of said two storage means.

2. A device as in claim 1 wherein said last mentioned means is an electronic switch which is set to the output of the first boxcar circuit storage means from said desired time until the time where the second boxcar circuit storage means is completely charged and then is switched to the output of the storage means of said second boxcar circuit until the new analog voltage level is stored in the storage means of said first boxcar circuit at which time said electronic switch is switched back to the output thereof in repeating sequence.

3. A device as in claim 1 wherein said last mentioned means is a maximum level detector where the output from the storage means of said first and said second boxcar circuits are each fed through respective cathode followers circuits to obtain low impedance and through respective diodes to an output resistor, the voltage across said output resistor assuming the value of the larger of the output voltages from the two storage means, whereas during the period said first boxcar circuit storage means is being discharged the output level will be held constant by the storage means of said second boxcar circuit, and in the event of a new level that is sampled and stored in the storage means of said first boxcar circuit is less than the previous level as soon as the storage means of the second boxcar circuit discharges below the new level the output of said last mentioned means then assumes the new level.

4. A device as in claim 1 wherein a common cathode follower is used in place of the gate means of said second boxcar circuit such that if the storage means of said second boxcar circuit is discharged it will always charge to said particular level as long as this level is larger than the charge in the storage means of said second boxcar circuit, and consequently, as soon as the storage means of said second boxcar circuit is discharged it will immediately charge up to the level that is stored in the storage means of said first boxcar circuit, and as the level in the storage means of said first boxcar circuit drops due to its shorter time constant the storage means of said second boxcar circuit will keep the output at the original level for a long period of time.

5. An electronic analog storage device comprising:
(*a*) first and second boxcar circuits connected in series,
(*b*) each said boxcar circuit including a gate means and a storage means,
(*c*) the storage means of said first boxcar circuit having a short time constant which allows rapid charging and rapid discharging thereof, the storage means of said second boxcar circuit having a long time constant and requiring a longer time for charging and discharging thereof,
(*d*) pulse means for initiating the discharging of the storage means of said first boxcar circuit just prior to sampling and storing a particular voltage input to said first boxcar circuit,
(*e*) pulse means for opening the gate means of said first boxcar circuit and allowing a pulse to charge the storage means thereof at a desired time and particular analog voltage input level,
(*f*) pulse means for initiating the discharging of the storage means of said second boxcar circuit at said desired time,
(*g*) pulse means for opening the gate means of said second boxcar circuit after the storage means of said second boxcar circuit is discharged allowing the charge on the storage means of said first boxcar circuit at the level of said particular analog voltage input level to be transferred to the storage means of said second boxcar circuit,
(*h*) means, connected to the output of the storage means of both said first and said second boxcar circuits, whose output level will indicate the value of the larger of the outputs of said two storage means.

6. A device as in claim 5 wherein said last mentioned means is an electronic switch which is set to the output of the first boxcar circuit storage means from said desired time until the time where the second boxcar circuit storage means is completely charged and then is switched to the output of the storage means of said second boxcar circuit until the new analog voltage level is stored in the storage means of said first boxcar circuit at which time said electronic switch is switched back to the output thereof in repeating sequence.

7. A device as in claim 5 wherein said last mentioned means is a maximum level detector where the output from the storage means of said first and said second boxcar circuits are each fed through respective cathode followers circuits to obtain low impedance and through respective diodes to an output resistor, the voltage across said output resistor assuming the value of the larger of the output voltages from the two storage means, whereas during the period of said first boxcar circuit storage means is being discharged the output level will be held constant by the storage means of said second boxcar circuit, and in the event a new level that is sampled and stored in the storage means of said first boxcar circuit is less than the previous level as soon as the storage means of the second boxcar circuit discharges below the new level the output of said last mentioned means then assumes the new level.

8. An electronic analog storage device comprising:
(*a*) input and output terminals,
(*b*) an input gate means,
(*c*) first and second storage means,
(*d*) a first delay means connected between said input terminal and said input gate means,
(*e*) the output of said input gate means connected to the input of said first storage means whose output in turn is connected to the input of said second storage means, (*f*) a maximum level detector connected between the outputs of said first and second storage means and said output terminal for indicating the larger of the outputs of said first and second storage means, (*g*) a sample pulse input terminal connected to said first storage means for initiating the discharge thereof, (*h*) a pulse generator connected to said second storage means, (*i*) a second delay means connected between said sample pulse input terminal and said pulse generator, and between said sample pulse input terminal and said input gate means, (*j*) a sample pulse means for feeding a pulse of width $\Delta t_1$ to said sample pulse input terminal to discharge said first storage means and after a delay by said second delay means equal to the pulse width $\Delta t_1$ said delayed sample pulse opening said input gate at a time when an analog signal voltage is to be sampled and stored, the analog signal voltage at said input terminal at the time said sample pulse means was present also being delayed by a time interval $\Delta t_1$ by said first delay means in order that both the sample pulse and desired analog signal will appear at the input gate at the same time, said delayed sample pulse also triggering said pulse generator to provide a pulse of width $\Delta t_2$ which in turn discharges said second storage means, and after its discharge said second storage means recharging up to the level that is stored in said first storage means, (*k*) said maximum level detector detecting the higher level of said first and second storage means and feeding this to said output terminal.

No references cited.

I. L. SRAGOW, *Primary Examiner.*